(12) United States Patent
Belzner et al.

(10) Patent No.: US 10,107,644 B2
(45) Date of Patent: Oct. 23, 2018

(54) METHOD AND COMPUTER PROGRAM PRODUCT FOR PROCESSING MEASUREMENT DATA OF A VEHICLE IN ORDER TO DETERMINE THE START OF A SEARCH FOR A PARKING SPACE

(71) Applicant: Bayerische Motoren Werke Aktiengesellschaft, Munich (DE)

(72) Inventors: Heidrun Belzner, Seefeld (DE); Daniel Kotzor, Seefeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/448,745

(22) Filed: Mar. 3, 2017

(65) Prior Publication Data

US 2017/0176211 A1 Jun. 22, 2017

Related U.S. Application Data

(63) Continuation of application No. PCT/EP2015/067029, filed on Jul. 24, 2015.

(30) Foreign Application Priority Data

Sep. 4, 2014 (DE) .................. 10 2014 217 654

(51) Int. Cl.
*G01C 21/12* (2006.01)
*G01C 21/36* (2006.01)
(Continued)

(52) U.S. Cl.
CPC ..... *G01C 21/3685* (2013.01); *G01C 21/3407* (2013.01); *G01C 21/3446* (2013.01); *G08G 1/14* (2013.01); *G01S 19/42* (2013.01)

(58) Field of Classification Search
USPC ....................................... 701/410
See application file for complete search history.

(56) References Cited

U.S. PATENT DOCUMENTS

| 2006/0142940 A1 | 6/2006 | Choi |
| 2008/0154497 A1 | 6/2008 | Terao |

(Continued)

FOREIGN PATENT DOCUMENTS

| CN | 1668893 A | 9/2005 |
| CN | 102722999 A | 10/2012 |

(Continued)

OTHER PUBLICATIONS

International Search Report (PCT/ISA/210) issued in PCT Application No. PCT/EP2015/067029 dated Oct. 16, 2015 with English translation (seven pages).

(Continued)

*Primary Examiner* — Tyler D Paige
(74) *Attorney, Agent, or Firm* — Crowell & Moring LLP

(57) ABSTRACT

A method is provided for processing measurement data of a vehicle in order to determine the start of a search for a parking space. The method is characterized in that an estimate of a parking target point is carried out, that an earliest start of a search for a parking space is determined and that a driving analysis is performed between these two points for determining the start of the search for a parking space using map data. Furthermore, a related computer program product is disclosed.

10 Claims, 1 Drawing Sheet

(51) Int. Cl.
*G08G 1/14* (2006.01)
*G01C 21/34* (2006.01)
*G01S 19/42* (2010.01)

(56) References Cited

U.S. PATENT DOCUMENTS

| | | |
|---|---|---|
| 2009/0187340 A1 | 7/2009 | Vavrus et al. |
| 2010/0052946 A1 | 3/2010 | Levine et al. |
| 2011/0015934 A1* | 1/2011 | Rowe .................... G06Q 30/02 705/1.1 |
| 2013/0211705 A1* | 8/2013 | Geelen .................. G01C 21/34 701/410 |
| 2013/0231824 A1* | 9/2013 | Wilson ................. G05D 1/0246 701/26 |
| 2014/0340242 A1 | 11/2014 | Belzner et al. |
| 2016/0210860 A1 | 7/2016 | Belzner et al. |
| 2017/0103649 A1* | 4/2017 | Belzner ................ G08G 1/0133 |
| 2017/0176211 A1* | 6/2017 | Belzner .............. G01C 21/3685 |

FOREIGN PATENT DOCUMENTS

| | | |
|---|---|---|
| CN | 103548068 A | 1/2014 |
| CN | 103606301 A | 2/2014 |
| DE | 11 2009 000 141 T5 | 11/2010 |
| DE | 10 2012 201 472 A1 | 8/2013 |
| DE | 10 2012 212 347 A1 | 1/2014 |
| DE | 10 2013 212 235 A1 | 12/2014 |
| EP | 1 729 088 A1 | 12/2006 |
| EP | 2 282 169 B1 | 3/2013 |
| JP | 2012-177712 A | 9/2012 |

OTHER PUBLICATIONS

German-language Written Opinion (PCT/ISA/237) issued in PCT Application No. PCT/EP2015/067029 dated Oct. 16, 2015 (five pages).

German Search Report issued in counterpart German Application No. 10 2014 217 654.9 dated Jun. 18, 2015 with partial English translation (13 pages).

Chinese Office Action issued in Chinese counterpart application No. 201580045959.X dated Jun. 26, 2018, with partial English translation (Twelve (12) pages).

\* cited by examiner

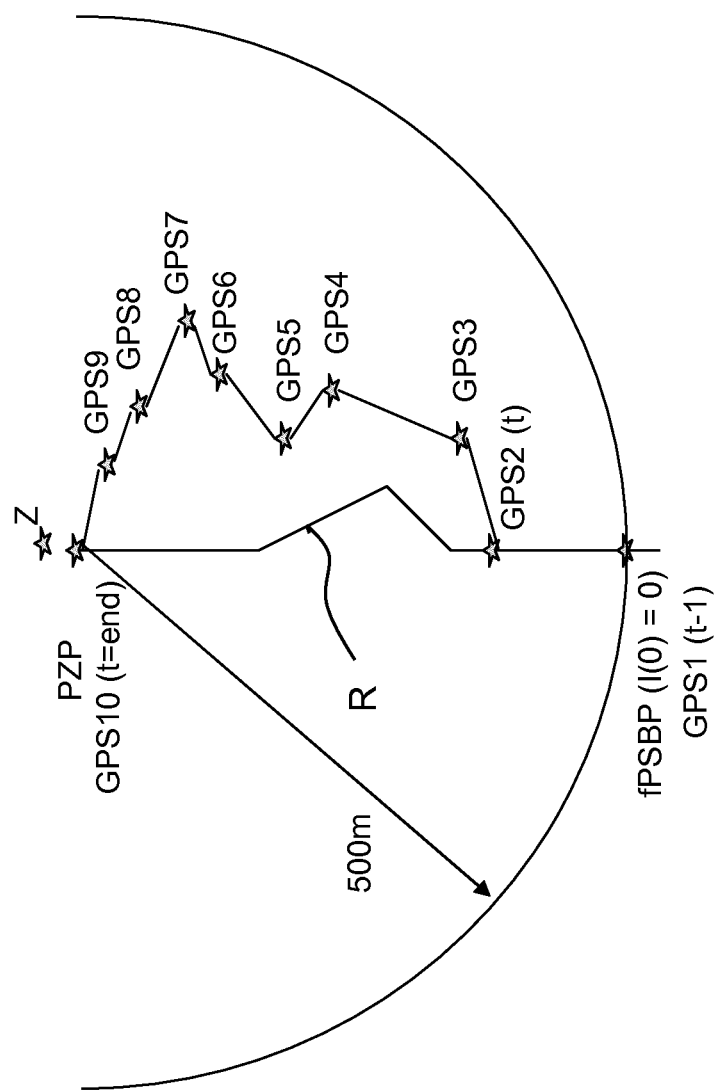

METHOD AND COMPUTER PROGRAM PRODUCT FOR PROCESSING MEASUREMENT DATA OF A VEHICLE IN ORDER TO DETERMINE THE START OF A SEARCH FOR A PARKING SPACE

CROSS REFERENCE TO RELATED APPLICATIONS

This application is a continuation of PCT International Application No. PCT/EP2015/067029, filed Jul. 24, 2015, which claims priority under 35 U.S.C. § 119 from German Patent Application No. 10 2014 217 654.9, filed Sep. 4, 2014, the entire disclosures of which are herein expressly incorporated by reference.

BACKGROUND AND SUMMARY OF THE INVENTION

The present invention relates to a method for processing measurement data of a vehicle in order to determine the beginning of a search for a parking space, and to a computer program product.

Determination of the beginning of a search for a parking space is of great importance to different parking information services and to town planning, for example.

Current parking services provide information relating to parking garages and publically or commercially operated P+R facilities (site, utilization level, reservation). The parking situation on public roads is largely unknown.

Dynamic information relating to the parking space situation on roads is becoming more and more in demand. The plurality of apps on the market use singular parking space entry and leaving events that are meant to be either communicated directly by the user or identified using a Smartphone (DE 10 2012 212 347 A1) or sensors.

In order to improve the estimation of parking space availability, a statement relating to the current traffic searching for a parking space is of decisive added value. Many apps accomplish this by using the input by the user from when he is searching for a parking space.

In addition, DE 10 2012 201 472 A1 describes a method for providing parking information relating to free parking spaces. This involves the use of a system for generating parking information. This method involves the traffic searching for a parking space being determined and being used in the method as an input variable for the system.

The quality of community-based apps is highly dependent on the number and quality of the inputs by the users. Therefore, a method taking place in automated fashion is desirable.

The systems that have been presented to date have some disadvantages. By way of example, a disadvantage of the system presented in DE 10 2012 201 472 A1 is that it is highly dependent on the calibration of the parameters. In addition, the start of a search for a parking space can be identified only at two specific points.

It is therefore an object of the present invention to provide a solution that can be used to reliably ascertain the beginning of traffic searching for a parking space in a simple manner.

The invention is based on the insight that this object can be achieved by virtue of data available in the vehicle being used to determine the beginning of the traffic searching for a parking space.

According to a first aspect, the invention therefore relates to a method for processing measurement data of a vehicle in order to determine the beginning of traffic searching for a parking space. The method is characterized in that estimation of a parking destination is performed, determination of an earliest point of beginning to search for a parking space is performed, and journey analysis is performed between these two points in order to ascertain the beginning of the traffic searching for a parking space using map data.

The measurement data of a vehicle are, according to the invention, position data. In this case, position data denote coordinates, particularly statements of degrees longitude and degrees latitude for a position. Additionally, the position data preferably contain a time stamp or other time statements about reception or determination of the coordinates. These position data can be determined using global positioning systems (GPS) or other positioning systems. These position data are received on the vehicle or determined thereon. Additional information, such as the speed of the vehicle, for example, is not needed in the method according to the invention in order to determine the start of a search for a parking space.

The "beginning of traffic searching for a parking space" is also referred to, according to the invention, as the start of the search for a parking space or the identification of traffic searching for a parking space. The beginning of the traffic searching for a parking space is in this case indicated by position data relating to the position at which the vehicle is located at the beginning of the search for a parking space.

The processing, according to the invention, of the measurement data, which are subsequently referred to as position data, can be effected in the vehicle or in a central computer unit that is separate from the vehicle. Processing in the vehicle involves the processing being effected particularly in what is known as an on-board unit. Processing in a central computer unit is also referred to as off-board processing.

The general concept that is used according to the invention for identifying traffic searching for a parking space is that a search for a parking space, that is to say traffic searching for a parking space, is expressed by changes in the behavior of the driver. According to the invention, it is therefore assumed that during a normal journey, which is also referred to as a journey to a destination and in which the driver does not search for an available parking space, the driver selects the shortest route to his destination. It is therefore possible to check whether there is, between the parking destination, that is to say the actual parking position of the vehicle, and the earliest point of beginning to search for a parking space, a time from which the driver deviates drastically from this behavior.

In this case, insufficiency denotes a deviation from the shortest link between a journey position and the parking position.

To this end, the method according to the invention first of all involves the parking destination, which can also be referred to as the final position, being estimated.

The parking destination may be the actual parking position of the vehicle or the destination position of the driver. In the latter case, it is assumed that the driver will park in proximity to his desired destination. The parking destination position is expressed, according to the invention, by position data, particularly degrees longitude and latitude. Preferably, in addition to these coordinates, a time statement is included in the position data relating to the parking destination position. Determination of the parking destination position can also be effected by navigation. This involves a navigation system, for example, determining a parking destination position or the latter being input by the user of the vehicle.

In addition, the method according to the invention involves the earliest point of beginning to search for a parking space being determined. The earliest point of beginning to search for a parking space is preferably determined using the ascertained parking destination. The earliest point of beginning to search for a parking space can also be referred to as the earliest possible point of beginning to search for a parking space or as the first possible point of beginning to search for a parking space.

Determination of the earliest point of beginning to search for a parking space is preferably effected using two assumptions. In particular, a maximum airline interval from the ascertained parking destination is assumed. Secondly, additionally or alternatively, it is possible to set a time limit. In this case, as a second assumption, it is assumed that traffic searching for a parking space cannot begin until after the determined maximum distance, that is to say the maximum interval from the destination, has been traveled through. This assumption takes account of the fact that the traffic searching for a parking space can by no means be in a region that is situated at a time before the time of the earliest point of beginning to search for a parking space. This assumption can be expressed by the following formula and taken into consideration in the method according to the invention:

$$t_{earliest\_search\_for\_parking\_space} \leq \max_i \{distance(GPS\text{-}position(t_i), GPS\text{-}position(GPS\text{-}position(t_{destination}))\}$$

Between the points ascertained in this manner, that is to say the parking destination and the earliest point of beginning to search for a parking space, journey analysis in order to determine the beginning of the traffic searching for a parking space is performed using map data.

The result of the journey analysis can indirectly or directly be the identification of the traffic searching for a parking space, that is to say can indirectly or directly indicate the beginning of the traffic searching for a parking space.

Identification of the traffic searching for a parking space includes, according to the present invention, preferably the output of a piece of information about at least the position at which the traffic searching for a parking space began. This piece of information may be, by way of example, an index that includes coordinates and a time statement concerning when the position was traveled through. In addition, corresponding information can also be output for the parking destination under consideration. This information can be processed onboard, stored and/or made available to an external computation unit for further processing.

Since journey analysis is first performed only in a limited physical, and preferably also temporal, range in relation to the parking destination and, second, it is performed using map data that are available on the vehicle, the method can be carried out quickly and reliably and requires only minimal computer capacity.

According to a preferred embodiment, the journey analysis involves the use of exclusively captured position data and map data.

Since, in contrast to the prior art, the present invention uses merely captured position data and map data in order to determine insufficiency, the computer power that is required for performing the method is minimized. In particular, complex determination of features or vectors for each journey position is not required. The method can therefore also be carried out on a device provided in the vehicle, for example what is known as an onboard unit, that is to say that the traffic searching for a parking space and, particularly the beginning of the search for a parking space, can be determined onboard. In addition, the method can also be performed online, that is to say during the journey.

The journey path is the path actually covered by the vehicle. The journey path can be ascertained from a series of successive positions, that is to say captured position data from the vehicle, at which the vehicle was located or is currently located during the journey. The sensed positions on the journey path, which can also be referred to as journey positions, are expressed by position data, particularly degrees longitude and latitude. These position data are received or determined and hence captured as measurement data on the vehicle at regular intervals of time, for example every second. Thus, the journey path or a portion of the journey path can be determined from the sum of the intervals between the individual journey positions.

Preferably, in addition to the position data along the journey path, the invention also takes into consideration the interval from the parking destination along a route. A route or routing in this case refers to a course that is ascertained on the basis of map data. In this case, a route refers to the shortest course along a road profile that is present on the map between a position of the vehicle and the parking destination position.

The course determined on the basis of a map may in this case be a particularly routing determined by a navigation system, which can also be referred to as a journey route or route. This takes into consideration not only the presence of roads but also, if need be, the usability of the road for the planned journey path. By way of example, routing can take into consideration obstacles such as one-way streets and the like. In a simple embodiment, however, it is also sufficient if just the presence of a road is checked on the basis of the map data and the shortest course is computed in accordance with these map data. Map data are in this case digital map position data. They are preferably, like the position data of the vehicle too, indicated as coordinates, particularly in degrees longitude and latitude. As a result, a comparison between the journey positions and the map can take place in a simple manner. The map data are available in the vehicle, for example in a navigation system, or these data can be accessed. In addition, a navigation system of a vehicle provides what is known as the routing capability. That is to say, the shortest course as a routing between a journey position, which may be the earliest point of beginning to search for a parking space, and the final position, particularly the parking destination position, can be determined by the navigation system and made available for the method according to the invention. The terms course on the map and routing are used as synonyms below, unless indicated otherwise.

According to a preferred embodiment, a difference between map data and an airline difference between travel positions are computed. In this case, the increase in the distance from the parking destination is computed as the difference between map data. This increase is determined for all points on a route from the earliest possible point of beginning to search for a parking space onward by computing the range on the map from the parking destination. This involves the increase being computed by forming a difference between the ranges of two successive points from the respective parking destination along the route. To determine airline difference, the interval between two successive journey positions, that is to say GPS points, is additionally determined. This interval is the airline interval between sensed GPS points. This interval is computed for each of the points on the route.

These two values, that is to say the increase in the distance from the parking destination and the interval between successive position data, are put into a relationship and in this way an insufficiency function is defined. The insufficiency function $\Delta e$ is the quotient of $\Delta d_{map}$ and $\Delta d_{airline}$, that is to say the quotient of the increase in the distance from the parking destination and the interval between two successive GPS points. This computes the deviation in the traveled route from the optimum route per distance traveled. In addition, a deviation in the route from the airline range between two GPS points, that is to say journey positions, is also sensed.

According to a preferred embodiment, a discrete integral is computed over the function of the insufficiency, which is defined by the map distances and an airline difference. For the earliest point of beginning to search for a parking space, the discrete integral is stipulated as zero in this case. The discrete integral is ascertained over time according to the invention. Since the integral of the insufficiency function is ascertained over time, a one-off deviation from the optimum course can be compensated for. In addition, the computation of the discrete integral has the advantage that it can be computed in a simple and quick manner and hence the determination of the traffic searching for a parking space can be effected simply and quickly.

The journey analysis can involve either the value of the insufficiency function being determined progressively or the discrete integral being computed for the respective journey position.

Preferably, however, the discrete integral is computed only if an error increase has been identified. In this case, an error increase refers to a position for which the insufficiency function is greater than zero. The insufficiency function is always greater than minus one (−1). In the most efficient case, that is to say for a journey along the shortest link between journey position and parking destination along the route, that is to say along the airline, a value of minus one (−1) is obtained for the insufficiency function. In the inefficient case, the value for the insufficiency function is greater than zero. Since the integral is computed only if an error increase has been identified, that is to say that the insufficiency function is greater than zero, the computation complexity can be minimized and nevertheless the beginning of the traffic searching for a parking space can be reliably determined.

According to the invention, traffic searching for a parking space can be deemed as having been identified as soon as the value of the discrete integral over the insufficiency function exceeds a threshold value. In that case, from the position for which the integral has exceeded the threshold value onward, traffic searching for a parking space is assumed to have been identified. Preferably, however, the journey analysis considers two threshold values for the discrete integral. In particular, traffic searching for a parking space is assumed only if firstly the integral exceeds a higher threshold value and secondly a lower threshold value has already been exceeded for the first time at an earlier time. The position of the earlier time is identified as the beginning of the search for a parking space in this preferred embodiment. This means that the result of the method according to the invention can be improved further, and, particularly, a plausibility check can be performed.

The analysis is, according to the invention, preferably performed from the earliest point of beginning to search for a parking space in the direction of the destination. This has the advantage that the analysis can be terminated as soon as traffic searching for a parking space is identified.

According to a further aspect, the invention relates to a computer program product that can be loaded into a digital computer or computer system and has software code sections that can be used to execute the steps when the product runs on the computer or computer system.

The software code sections can also be referred to as an algorithm. Preferably, the computer program product comprises at least two sections, one section being the step of estimating the parking destination and determining the earliest point of beginning to search for a parking space, and the second section being used for the journey analysis between these points. The two sections of the computer program product, which are preferably software code sections, are preferably linked to one another such that the results of the first section can be made available indirectly or directly to the second section. According to the invention, the results of the first section can be made available indirectly to the second section and, in particular, can first of all be stored in a memory.

The computer program product and particularly the software code sections preferably have at least one interface to a navigation system of the vehicle. This interface may be stored as a retrieve command in the software code section. This interface can be used to request a course or routing necessary for the method according to the invention or other map data from the navigation system.

The software code section(s) can, according to the invention, preferably access the degrees longitude and latitude of the positions of the vehicle at a rate of once per second, for example. In addition, the software code section may also have a function that permits computation of the routed interval within a map from two positions or that access such a function.

Advantages and features that are described for the method according to the invention likewise apply—insofar as they can be used—to the computer program product according to the invention, and vice versa. The advantages and features are described only once in this case if need be.

According to the invention, the method can be performed with a system that includes a measuring unit in the vehicle that, during the journey, measures a position $p_i$ in equidistant time steps $t_i$. The evaluation is effected directly in the vehicle at the end of the journey or after transmission of the data to a central unit.

The evaluation of the data is effected, according to the invention, in three steps, namely destination estimation, determination of the earliest point of beginning to search for a parking space and journey analysis.

Destination estimation can be effected by performing navigation, that is to say route determination or routing. In a simple embodiment, the estimation may be assumed to be that the actual destination of the driver is equivalent to the final parking position, that is to say the parking destination.

Determination of the earliest point of beginning to search for a parking space, which can also be referred to as the earliest possible beginning to search for a parking space, is effected on two assumptions. Firstly, it is assumed that this point lies within a maximum interval from the parking destination. The maximum interval is computed as an airline interval, which simplifies the estimation. By way of example, an interval of a 500 m airline can be assumed in this case. Secondly, it is assumed that the beginning of the traffic searching for a parking space must occur later than the distance maximum, that is to say the aforementioned maximum interval from the parking destination. This means that, in addition to the check on the interval by airline, the time at which a position is traveled through is also checked. The earliest possible point of beginning to search for a parking space must thus have been traveled through at a time after the point on the route that is at the maximum interval from the parking destination.

So that the traffic situation is depicted more realistically, the ranges on the map, that is to say the route or course determined by routing, are required from the earliest point of beginning to search for a parking space onward. The subsequently performed journey analysis between the parking destination estimated in this manner and the point of beginning to search for a parking space therefore involves the map distances from the parking destination for all points on this route and an airline difference being computed. The fundamental concept is analysis of the journey for insufficiency.

In this context, an insufficiency function is defined $$\Delta e = \frac{\text{Increase in the distance from the destination}}{\text{Interval between two successive GPS points}} = \frac{\Delta d_{map}}{\Delta d_{airline}}$$

This takes into consideration the deviation in the route traveled from the optimum route per distance traveled.

The numerator of the insufficiency function is computed using the map distance, and the denominator is computed using the airline distance, namely the difference between two successive GPS points, that is to say journey positions.

The denominator can therefore be expressed by the following formula:

$\Delta d$airline=GPS position($t$)−GPS position($t$−1)

For the increase in the distance from the destination, route computation to the parking destination is effected, according to the invention, preferably for each point, that is to say for each journey position.

For each computation of $\Delta e$, the difference in the map distance are then computed for successive journey positions, that is to say GPS positions. This involves the use of the following formula:

$\Delta d$map=distance$_{map}$(GPS position($t$), parking destination)

−distance$_{map}$(GPS position($t$−1), parking destination position)

It is assumed that for a point interval of the GPS positions of a few meters, the route or course on the map is only insignificantly longer than the airline range.

The value of the insufficiency function $\Delta e$ is always greater than −1. In the most efficient case, that is to say for a journey in the direction of the parking destination along the airline, a quotient of −1 is obtained, and in the inefficient case, a value of greater than 0. The insufficiency function is computed from the earliest point of beginning to search for a parking space onward.

Subsequently, the discrete integral is computed over $\Delta e$. This first of all involves a check to determine whether there is an error increase, that is to say whether $\Delta e > 0$. The integral is computed as follows:

$I(t)=I(t-1)+\Delta e \cdot \Delta t$ if $\Delta e > 0$ $I(t)=I(t-1)$ if $\Delta e \leq 0$ where $I(0)=0$ If I(t) exceeds a particular value (for example 15 000 [ms]), then traffic searching for a parking space can be assumed and the algorithm by which the method is performed can report the presence of a journey looking for a parking space. As the beginning of the traffic searching for a parking space, the position at which the integral previously exceeded a further, lower threshold value (for example 500 [ms]) for the first time is then indicated.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic depiction of GPS points and a route to illustrate the method according to an embodiment of the invention.

DETAILED DESCRIPTION OF THE DRAWING

Referring to FIG. 1, in this example the vehicle should move along the route R to the parking destination PZP, which is in direct proximity to the destination Z in FIG. 1. From a radius of 500 m, for example, the positions of the vehicle are sensed in the form of GPS positions, which are received on the vehicle anyway, and the insufficiency function is computed therefrom. Assume the vehicle in the example shown in FIG. 1 moves from the first GPS point GPS1, which is the earliest point of beginning to search for a parking space fPSBP, to the second GPS point GPS2. If the insufficiency function is computed for these points as indicated above, then a value of minus one (−1) is obtained in this case. At the GPS point GPS3, the vehicle deviates from the route R. The insufficiency function for this GPS point GPS3 is one (1), for example. In the same way, the insufficiency function is computed for the further GPS points.

Following the insufficiency function computation, the discrete integral is ascertained over time. In this case, exceeding of a threshold value involves a check being performed to determine whether a lower threshold value has already been exceeded previously. The position at which this lower threshold value was exceeded is then considered to be the beginning of the traffic searching for a parking space and can be output.

The present invention can be used to achieve a series of advantages. By way of example, the more accurate computation of the beginning of the traffic searching for a parking space that is possible by virtue of the invention can lead to a more accurate forecast of parking information. In addition, this information can be used by town planners. The system that can be used to carry out the method according to the invention is implementable in a mass produced vehicle.

LIST OF REFERENCE SYMBOLS

GPS-n Journey positions
R Route/course
PZP Parking destination
Z Destination
fPSBP Earliest point of beginning to search for a parking space The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing measurement data of a vehicle in order to determine a beginning of traffic searching by a driver of the vehicle for a parking space, the method comprising the acts of:
   estimating a parking destination;
   determining an earliest point that the driver can begin to search for a parking space along a route to the estimated parking destination;
   performing journey analysis, using map data, between the estimated parking destination and the determined earliest point of beginning to search for the parking space; and
   determining the beginning of the traffic searching by the driver for the parking space.

2. The method as claimed in claim 1, wherein the journey analysis involves use of exclusively captured position data and map data.

3. The method as claimed claim 1, wherein a difference between the map data and an airline difference are computed, wherein the airline difference comprises a distance between GPS points.

4. The method as claimed in claim 1, wherein a relationship of an increase in distance from the parking destination and an interval between successive position data are used as an insufficiency function.

5. The method as claimed in claim 4, wherein a discrete integral is computed over the insufficiency function.

6. The method as claimed in claim 5, wherein the discrete integral is computed only if an error increase has been identified.

7. The method as claimed claim 5, wherein
   when a threshold value of the discrete integral is exceeded, traffic searching for a parking space is deemed to have been identified.

8. The method as claimed in claim 5, wherein
   the journey analysis considers two threshold values for the discrete integral, and traffic searching for a parking space is deemed to have been identified only if both threshold values are exceeded.

9. The method as claimed in claim 1, wherein
   the journey analysis is performed from the earliest point of beginning to search for a parking space in the direction of the parking destination.

10. A computer program product comprising a non-transitory computer readable medium having stored thereon program code sections that, when executed on a processor, cause the processor to:
   estimate a parking destination;
   determine an earliest point that a driver of a vehicle can begin to search for a parking space along a route to the estimated parking destination;
   perform journey analysis, using map data, between the estimated parking destination and the determined earliest point of beginning to search for the parking space; and
   determine the beginning of the traffic searching by the driver for the parking space.

* * * * *